United States Patent
Kuzel et al.

(10) Patent No.: US 8,260,514 B2
(45) Date of Patent: Sep. 4, 2012

(54) METHOD FOR SUPPORTING A BRAKE SYSTEM IN CASE OF REDUCED EFFECTIVENESS

(75) Inventors: Thomas Kuzel, Gross-Krotzenburg (DE); Bernd Ummer, Bodnogg (DE); Holger Esslinger, Alzey (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1034 days.

(21) Appl. No.: 11/663,387

(22) PCT Filed: Sep. 20, 2005

(86) PCT No.: PCT/EP2005/054684
§ 371 (c)(1), (2), (4) Date: Sep. 5, 2008

(87) PCT Pub. No.: WO2006/032657
PCT Pub. Date: Mar. 30, 2006

(65) Prior Publication Data
US 2009/0118956 A1 May 7, 2009

(30) Foreign Application Priority Data
Sep. 24, 2004 (DE) .......................... 10 2004 046 380

(51) Int. Cl.
*B60T 8/88* (2006.01)
(52) U.S. Cl. .......................................... 701/70; 303/122
(58) Field of Classification Search .................. 303/155, 303/161; 701/70–98
See application file for complete search history.

(56) References Cited

U.S. PATENT DOCUMENTS

| | | | | |
|---|---|---|---|---|
| 3,574,416 A | * | 4/1971 | Skoyles | 303/116.4 |
| 4,230,376 A | * | 10/1980 | Brearley et al. | 303/195 |
| 4,523,791 A | * | 6/1985 | Belart et al. | 303/159 |
| 4,917,444 A | * | 4/1990 | Ishido et al. | 303/146 |
| 4,941,553 A | * | 7/1990 | Harrison | 188/156 |
| 4,986,611 A | * | 1/1991 | Goshima et al. | 303/156 |
| 5,102,207 A | * | 4/1992 | Leppek et al. | 303/115.2 |
| 5,106,171 A | * | 4/1992 | Leppek et al. | 303/162 |
| 5,150,299 A | * | 9/1992 | Fujioka | 701/78 |
| 5,171,070 A | * | 12/1992 | Okazaki et al. | 303/176 |

(Continued)

FOREIGN PATENT DOCUMENTS
DE 10137273 3/2001
(Continued)

OTHER PUBLICATIONS

Anti-lock braking system. (Sep. 19, 2005). In Wikipedia, The Free Encyclopedia. Retrieved 16:31, May 23, 2011, from http://en.wikipedia.org/w/index.php?title=Anti-lock_braking_system&oldid=23535790.*

(Continued)

*Primary Examiner* — Mark Hellner
*Assistant Examiner* — Ari M Diacou

(57) ABSTRACT

Disclosed is a method for increasing the braking effect in a motor vehicle with a hydraulic brake system. In the method, in case of a reduced effectiveness of the brake system, a brake pressure in at least one wheel brake is increased by switching on an energy supply unit. A check is made whether a brake pressure ($p_{TMC}$) in a master brake cylinder (3) reaches a predetermined threshold value ($p_T$), and that the energy supply unit (9, 10) is disabled upon expiry of a predetermined length of time ($\Delta t$), which begins the instant it is detected that the brake pressure ($p_{TMC}$) has reached the predetermined threshold value ($p_T$). Also disclosed is a device that is appropriate to implement the method.

14 Claims, 2 Drawing Sheets

U.S. PATENT DOCUMENTS

| | | | |
|---|---|---|---|
| 5,184,299 A * | 2/1993 | Hogan et al. | 701/78 |
| 5,333,948 A * | 8/1994 | Austin et al. | 303/24.1 |
| 5,487,594 A * | 1/1996 | Schneider | 303/155 |
| 5,727,854 A * | 3/1998 | Pueschel et al. | 303/155 |
| 5,853,230 A * | 12/1998 | Wagner et al. | 303/113.4 |
| 6,086,167 A * | 7/2000 | Heckmann et al. | 303/155 |
| 6,161,074 A * | 12/2000 | Sielagoski et al. | 701/96 |
| 6,212,458 B1 * | 4/2001 | Walenty et al. | 701/51 |
| 6,226,586 B1 | 5/2001 | Luckevich et al. | |
| 6,241,324 B1 * | 6/2001 | Miyazaki | 303/150 |
| 6,318,817 B1 * | 11/2001 | Martin et al. | 303/116.1 |
| 6,341,828 B1 * | 1/2002 | Ohtsu | 303/171 |
| 6,405,117 B1 * | 6/2002 | Walenty et al. | 701/70 |
| 6,460,941 B1 * | 10/2002 | Zenzen et al. | 303/122.03 |
| 2001/0033106 A1 * | 10/2001 | Shirai et al. | 303/177 |
| 2003/0045989 A1 * | 3/2003 | Walenty et al. | 701/71 |
| 2003/0220731 A1 * | 11/2003 | Zierolf | 701/71 |
| 2009/0015059 A1 * | 1/2009 | Yamamoto | 303/12 |

FOREIGN PATENT DOCUMENTS

DE  10238427  5/2003

OTHER PUBLICATIONS

Bell, Kirk. "SUV Safety" Mar. 10, 2006. HowStuffWorks.com. <http://auto.howstuffworks.com/car-driving-safety/safety-regulatory-devices/cg-suv-safety.htm> May 26, 2011.*

Nice, Karim. "How Anti-Lock Brakes Work" Aug. 23, 2000. HowStuffWorks.com. <http://auto.howstuffworks.com/auto-parts/brakes/brake-types/anti-lock-brake.htm> May 26, 2011.*

Electronic stability control. (May 24, 2011). In Wikipedia, The Free Encyclopedia. Retrieved 23:00, May 26, 2011, from http://en.wikipedia.org/w/index.php?title=Electronic_stability_control&oldid=430620974.*

* cited by examiner

METHOD FOR SUPPORTING A BRAKE SYSTEM IN CASE OF REDUCED EFFECTIVENESS

This application is the U.S. national phase of international application PCT/EP05/54684 filed Sep. 20, 2005, which designated the U.S. and which claims the benefit of priority of German Patent Application Number 10 2004 046 380.8 filed Sep. 24, 2004. The contents of each of the aforementioned documents are incorporated herein in their entirety.

BACKGROUND OF THE INVENTION

The present invention relates to a method for increasing the braking effect in a motor vehicle with a hydraulic brake system, wherein in case of a reduced effectiveness of the brake system, a brake pressure in at least one wheel brake is increased by switching on an energy supply unit.

In addition, the invention relates to a device that is suitable to implement the method.

When subjected to high thermal load, under the influence of saline solution and major wear, hydraulic brake systems exhibit a reduced effectiveness so that, even given a high initial pressure in the master brake cylinder that is adjusted by the driver, the brake system will not bring about sufficient deceleration of the vehicle. The reduced braking effect at high working temperatures of the brake system is referred to as 'fading'.

In the cases illustrated hereinabove, the reduced braking effect of the vehicle brake system results, however, especially from a reduced coefficient of friction between the brake pads and the brake disc, so that a special rate of brake pressure is required in order to brake the vehicle effectively.

German published application DE 102 38 427 A1 discloses a method of equal type, wherein in case of limited effectiveness of the vehicle brake, enabling of an energy supply unit causes increase of the brake pressure or the brake force in the wheel brakes because hydraulic fluid is pumped out of the master brake cylinder into the wheel brakes. A method of this type is also referred to as FBS function (FBS: Fading Brake Support).

The energy supply unit is activated in the FBS function when the initial pressure in the master brake cylinder adjusted by the driver exceeds an activation threshold, which is determined depending on the vehicle deceleration. Thus, the energy supply unit is enabled when the actual vehicle deceleration is by a defined value lower than the vehicle deceleration that is expected due to the adjusted initial pressure, with the brake system functioning properly.

The energy supply unit is usually disabled when the initial pressure in the master brake cylinder drops below a predetermined threshold value, since it is assumed in this case in particular that the driver has released the brake pedal and, thus, terminated the brake operation.

However, the problem encountered in this respect is that frequently so high a quantity of hydraulic fluid is pumped from the master brake cylinder into the wheel brakes that a drop in pressure occurs in the master brake cylinder, without the driver releasing the brake pedal.

This will disable the energy supply unit, although the driver continues with the brake operation. With a continuous brake application by the driver, the energy supply unit is switched on again when the pressure in the master brake cylinder has increased beyond the activation threshold after the supply of brake fluid from the wheel brakes. In total, however, the result is a reduced average braking effect and thus a longer stopping distance.

Besides, the driver will notice the pedal reaction and the noise developing during very frequent enabling and disabling operations of the energy supply unit by a higher frequency and, thus, in an unpleasant way.

In view of the above, an object of the invention is to overcome the illustrated shortcomings of the state of the art, and, in doing so, to further develop in particular a method of the type mentioned in the beginning and a device for implementing the method in such a way that the stopping distance is shortened.

SUMMARY OF THE INVENTION

According to the invention, this object is achieved by a method for increasing the braking effect in a motor vehicle with a hydraulic brake system, wherein in case of a reduced effectiveness of the brake system, a brake pressure in at least one wheel brake is increased by switching on an energy supply unit. When the energy supply unit (9, 10) enabled, a check is made whether a brake pressure ($p_{TMC}$) in a master brake cylinder (3) reaches a predetermined threshold value ($p_T$), and in that the energy supply unit (9, 10) is disabled upon expiry of a predetermined length of time ($\Delta t$), which begins the instant it is detected that the brake pressure ($p_{TMC}$) has reached the predetermined threshold value ($p_T$).

The object is also achieved by a device for increasing the braking effect of a hydraulic brake system of a motor vehicle, having a master brake cylinder, in which a brake pressure transmittable to at least one wheel brake can be built up, a pressure sensor adapted to sense the brake pressure in the master brake cylinder, a control unit connected to the pressure sensor, and an energy supply unit that is controllable by the control unit and can be enabled when it is detected in the control unit that the brake pressure in the master brake cylinder exceeds an activation threshold value that is calculated depending on the vehicle deceleration, wherein the device comprises a deceleration unit, which can be activated by the control unit, with the energy supply unit (9, 10) enabled, when the brake pressure ($p_{TMC}$) reaches a predetermined threshold value ($p_T$), and the deceleration unit is used to produce a signal upon expiry of a predetermined length of time ($\Delta T$) after its activation, which signal causes deactivation of the energy supply unit (9, 10).

The invention arranges that a method of the type initially mentioned is implemented in such a fashion that, with the energy supply unit enabled, a check is made whether a brake pressure in a master brake cylinder reaches a predetermined threshold value, and that the energy supply unit is disabled upon expiry of a predetermined length of time, which begins the instant it is detected that the brake pressure has reached the predetermined threshold value.

Thus, the invention is based on the idea that the energy supply unit shall not be disabled immediately upon a drop in pressure in the master brake cylinder, but to maintain the service of the energy supply also after a drop in pressure below a predetermined threshold value for a predetermined finite length of time. During this time, hydraulic fluid can flow out of a supply or compensating tank connected to the master brake cylinder into the master brake cylinder.

It is achieved hereby that the increased wheel brake pressure is maintained for a predetermined time also after a drop in pressure in the master brake cylinder, while it is provided in the prior art method to disable the energy supply unit in the event of a drop in pressure in the master brake cylinder, with the result that the brake pressure in the wheel brakes declines as well.

Thus, the invention is especially advantageous in that the average braking effect during a brake operation supported by the FBS function is enhanced and the stopping distance of the vehicle is reduced. Besides, the phases in which the energy supply unit is operative are extended so that noticeable pedal reactions during activation and deactivation of the pump become more rare, which the driver considers as an enhancement of the operating comfort of the brake system.

In a preferred embodiment of the invention, it is provided that the predetermined length of time ranges between 100 ms and 1000 ms.

In an especially preferred embodiment of the invention, the predetermined length of time ranges between 400 ms and 600 ms.

The reduced effectiveness of the brake system is detected in an expedient embodiment of the invention when the brake pressure adjusted by the driver in the master brake cylinder exceeds an activation threshold that is determined depending on a vehicle deceleration.

Further, it is provided in a favorable embodiment of the invention that the energy supply unit is a hydraulic pump driven by a motor.

In addition, it is preferred that the energy supply unit is a component of an ESP system.

The reduced effectiveness of the brake system is detected in a suitable embodiment of the invention when the brake pressure adjusted by the driver in the master brake cylinder exceeds an activation threshold value that is determined depending on a vehicle deceleration.

Another object of the invention is directed to a device for increasing the braking effect of a hydraulic brake system of a motor vehicle, comprising a master brake cylinder, in which a brake pressure transmittable to at least one wheel brake can be built up, a pressure sensor adapted to sense the brake pressure in the master brake cylinder, a control unit connected to the pressure sensor, and an energy supply unit that is controllable by the control unit and can be enabled when it is detected in the control unit that the brake pressure in the master brake cylinder exceeds an activation threshold value that is calculated depending on the vehicle deceleration.

The device is characterized in that it comprises a deceleration unit, which can be activated by the control unit, with the energy supply unit enabled, when the brake pressure reaches a predetermined threshold value, and the deceleration unit is used to produce a signal upon expiry of a predetermined length of time after its activation, which signal causes deactivation of the energy supply unit.

Further advantages, special features, and suitable improvements of the invention can be seen in the subclaims and the subsequent illustration of preferred embodiments of the invention by way of the Figures.

DETAILED DESCRIPTION OF THE DRAWINGS

Figure 1:
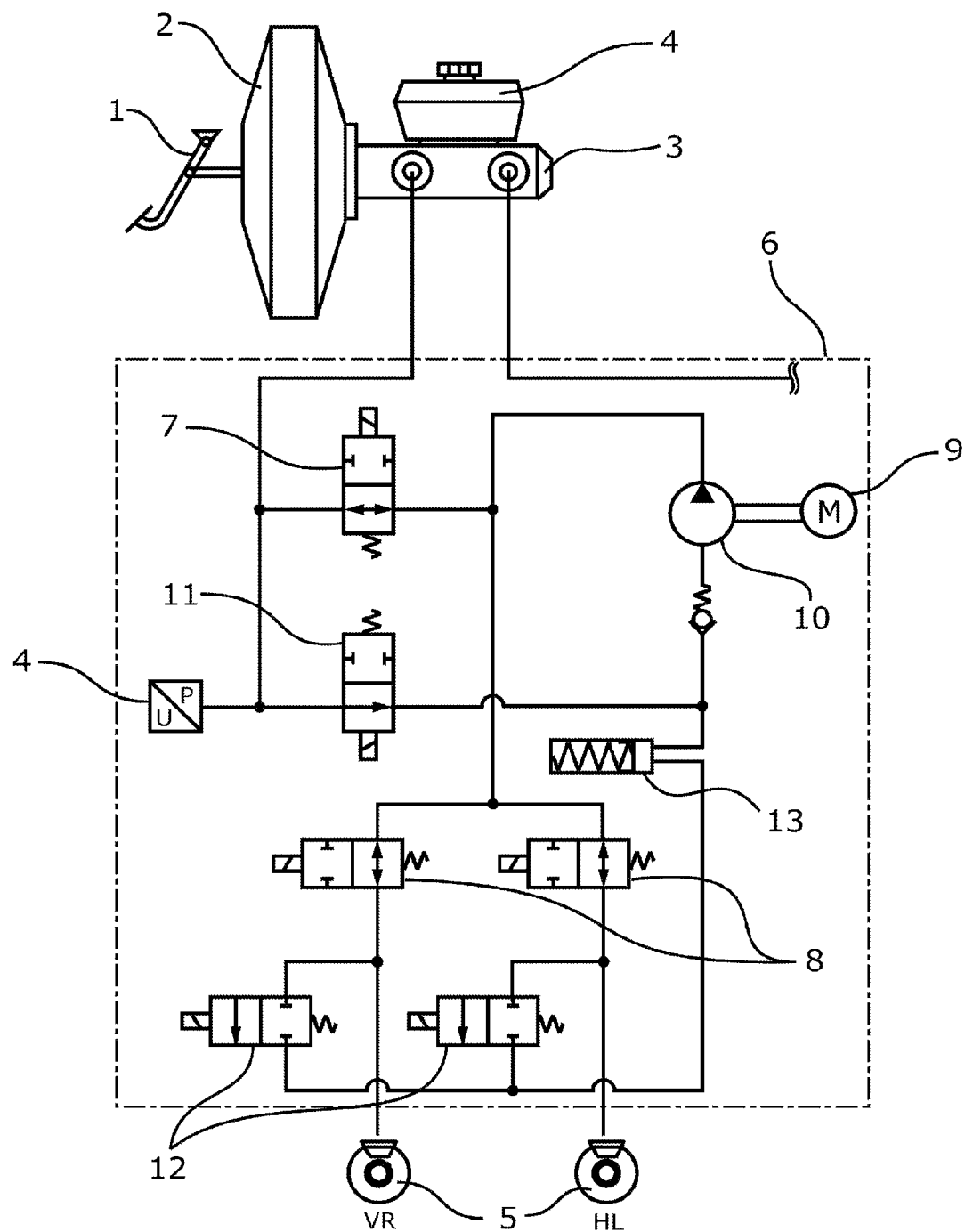
FIG. 1 shows the principal design of a vehicle brake system that is suitable to implement the invention.

The vehicle brake system that is shown in a cross-sectional view in FIG. 1 and is well suited to implement the invention, comprises an actuating device 1, which is connected to a master brake cylinder 3 by way of a brake booster 2 and is preferably designed as a brake pedal.

The master brake cylinder 3 connects to a supply tank 4 for hydraulic fluid in terms of flow. Advantageously, it is configured as a so-called tandem master cylinder, wherein in each case one of two coupled pressure chambers is provided to supply one brake circuit with pressure. Usually, there is an X-allotment of the brake circuits, meaning that one pressure chamber feeds the front right (FR) and the rear left (RL) wheel brake 5, while the other pressure chamber feeds the front left and the rear right wheel brake 5.

The master brake cylinder 3 is equipped with two pistons coupled to one another (not shown in FIG. 1) and two pressure chambers into which the pistons are introduced upon brake application. When the brake is released, there is a connection between the pressure chambers and the supply tank 4, either directly through a bore in the pressure chamber or through a central valve in the piston, which is open when the brake is not applied. When the piston furnished with a central valve is introduced into the pressure chamber, the central valve will close due to the counteracting pressure in the pressure chamber, and the latter chamber is sealed in relation to the supply tank. As regards pressure chambers without a central valve in the piston, a sleeve brushes over the bore, through which the pressure chamber is in communication with the supply tank 4, and seals the pressure chamber in relation to the supply tank.

The master brake cylinder 3 connects to the wheel brakes 5 by way of a hydraulic unit 6, which is provided in equal form for each one of the two brake circuits. Therefore, only that part of the hydraulic unit is shown in FIG. 1 that is associated with one of the brake circuits.

The wheel brakes 5 connect to the master brake cylinder 3 by way of a normally open separating valve 7, and one inlet valve 8, which is also normally open, is assigned in addition to each wheel brake 5. In a brake operation, which is exclusively controlled by the driver, the brake pressure $p_{TMC}$, which is built up in the master brake cylinder 3 by the driver using the brake booster 2 and which is also referred to as initial pressure, is transmitted directly to the wheel brakes 5.

The illustrated brake force system, however, also permits an externally controlled development of brake pressure $p_{wheel}$ in the wheel brakes 5 by means of the hydraulic pump 10 driven by the motor 9. For pressure build-up, the separating valve 7 closes and the normally closed change-over valve 11 opens so that a connection is provided between the master brake cylinder 3 and the suction side of the hydraulic pump 10, and the master brake cylinder 3 is uncoupled from the pressure side of the hydraulic pump 10. The hydraulic pump 10 is thus in a position to supply hydraulic fluid from the master brake cylinder 3 or the supply tank 4 into the wheel brakes 5 in order to increase the wheel brake pressure $p_{wheel}$.

A normally closed outlet valve 12 is associated with each wheel brake 5 in order to reduce the brake pressure $p_{wheel}$ in the wheel brakes 5. When the outlet valve 12 opens, hydraulic fluid can escape from the corresponding wheel brake 7 into the low-pressure accumulator 13. The hydraulic fluid can then be supplied out of the low-pressure accumulator 13 back into the master brake cylinder 3 using the hydraulic pump 10, to what end the change-over valve 11 and the inlet valves 8 close and the separating valve 7 opens.

In addition, a brake pressure $p_{wheel}$ in the wheel brakes 5 can be maintained constant by closing both the inlet valve 8 associated with the wheel brake 5 and the associated outlet valve 12.

The brake pressure $p_{TMC}$ adjusted by the driver in the master brake cylinder 3 is measured by means of a pressure sensor 14, whose signal is transmitted to a control unit that executes the control of the hydraulic unit 6 and the valves 7, 8, 11 and 12 incorporated therein, and of the motor 9.

Brake systems configured in the illustrated way are known to the expert in the art in particular as a component of ESP or ESC systems (ESP: Electronic Stability Program or ESC: Electronic Stability Control) being used already in a large number of vehicles. Such brake systems can be used in an ABS system (ABS: Anti-Lock System) as well.

In addition, it is also possible to realize the FBS function, on which the invention at topic is based, in brake systems of this type.

According to the FBS function, a brake pressure $p_{wheel}$ that is increased compared to the driver's specifications is applied to the wheel brakes 5 using the hydraulic pump 10 when a reduced effectiveness of the brake system is detected during a brake operation.

This corresponds to the activation of a so-called brake assist system, the function of which consists in increasing the brake pressure $p_{wheel}$ in the wheel brakes 5 compared to the brake pressure $p_{TMC}$. The brake assist system is activated especially in emergency braking situations and is also per se known to the expert in the art.

To activate the FBS function, an activation threshold $p_{AT}$ for the brake pressure $p_{TMC}$ in the master brake cylinder 3 is calculated during a brake operation depending on the vehicle deceleration that is measured by means of a longitudinal acceleration sensor and/or determined from the signals of wheel rotational speed sensors, as has been described in detail in German published application DE 102 38 427 A1. Reference is made to the latter publication in connection with the FBS function, especially with regard to determining the activation threshold value.

Once the brake pressure $p_{TMC}$ adjusted by the driver in the master brake cylinder 3 exceeds the activation threshold value $p_{AT}$, the brake assist system is activated by a control unit, which is provided to execute the FBS function. Preferably, the brake assist system is designed as a so-called hydraulic brake assist system (HBA), where the pressure increase is carried out by means of the hydraulic unit 6, i.e. in particular by means of the hydraulic pump 10 driven by the motor 9, to what end the motor 9 and the valves 7, 11 are driven in the corresponding fashion by the FBS control unit (i.e. the separating valve 7 closes and the change-over valve 11 opens).

The brake assist system is deactivated when the brake pressure $p_{TMC}$ in the master brake cylinder 3 falls under a predetermined threshold value, with the FBS function activated. This condition is based on the fact that the braking request of the driver is detected by the FBS control unit of the FBS function using the brake pressure $p_{TMC}$, and it is assumed that the driver releases the brake when the brake pressure $p_{TMC}$ is decreasing.

When the hydraulic pump 10 is switched on, the brake pressure $p_{TMC}$ in the master brake cylinder 3 will, however, drop as well, without the driver releasing the brake, because hydraulic fluid is sucked by the hydraulic pump 10 out of the master brake cylinder 3, what is illustrated by way of FIG. 2 in the following.

Figure 2:
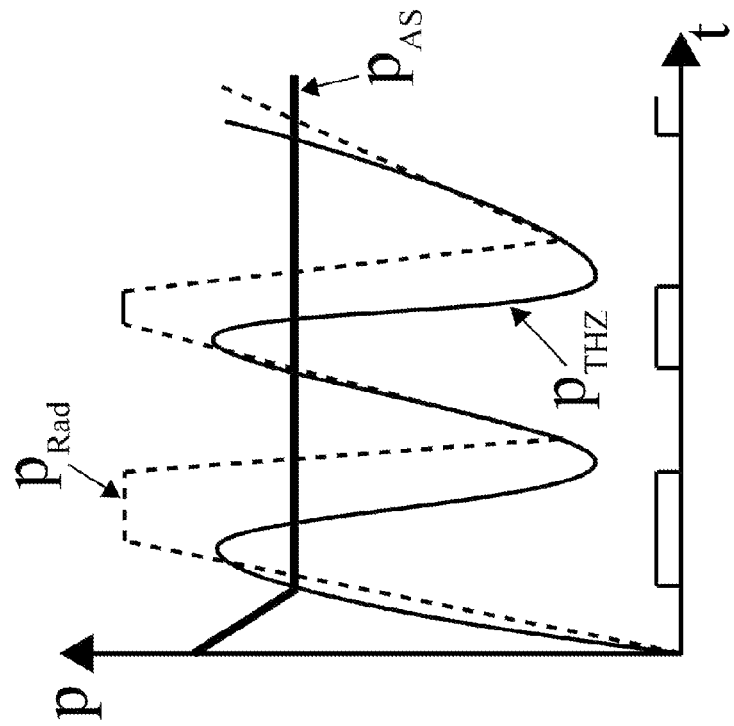
FIG. 2 is a diagram illustrating the time variation of the brake pressure in a wheel brake and the master brake cylinder, the activation threshold of the FBS function, and the activity of the FBS function according to the state of the art.

The diagram in FIG. 2 illustrates the time variations of the brake pressure $p_{TMC}$ in the master brake cylinder 3 and the wheel brake pressures $p_{wheel}$ as well as the activation threshold $p_{AT}$, which result in the known FBS function. It is also illustrated in which periods of time the FBS function is activated or the hydraulic pump 10 is switched on (FBS active).

It can be seen in FIG. 2 that the activation of the FBS function takes place as soon as the brake pressure $p_{TMC}$ exceeds the activation threshold $p_{AT}$. Subsequent thereto, brake pressure $p_{wheel}$ is built up in the wheel brakes 5, which is increased compared to the brake pressure $p_{TMC}$ adjusted by the driver. This is done in that hydraulic fluid is aspirated by the hydraulic pump 10 from the master brake cylinder 3 and is pumped into the wheel brakes 5, with the result that the brake pressure $p_{TMC}$ drops in the master brake cylinder 3. A pressure limiting valve (not shown in FIG. 1) integrated in the hydraulic unit 6 is used to limit the wheel brake pressure $p_{wheel}$ to a predetermined maximum value.

The FBS intervention is terminated by deactivation of the hydraulic pump 10 when the brake pressure $p_{TMC}$ drops below a predetermined threshold value that is not shown in FIG. 2. When the hydraulic pump 10 is deactivated, hydraulic fluid flows out of the wheel brakes 5 back into the master brake cylinder 3 so that the brake pressure $p_{TMC}$ re-increases.

When the driver continues with the brake application, the brake pressure $p_{TMC}$ will again exceed the activation threshold value $p_{AT}$, and the FBS function is re-activated by a new switching-on of the hydraulic pump 10, as is illustrated in the diagram in FIG. 2.

The illustrated sequence repeats cyclically until the driver releases the brake pedal so that the FBS function is alternatingly activated and deactivated during a brake operation, with the frequency being defined by the periodic variation of the brake pressure $p_{TMC}$ in the master brake cylinder 3.

It is arranged within the limits of the invention that the hydraulic pump 10 maintains its operation for a predetermined length of time $\Delta t$ after the drop in pressure in the master brake cylinder 3 in order to extend the phases in which the FBS function is activated during a brake operation.

To this end, it is checked when the FBS function is activated, whether the brake pressure $p_{TMC}$ in the master brake cylinder 3 reaches a predetermined threshold value $p_T$, which may e.g. be close to a value of 0 bar at a brake pressure $p_{TMC}$. If this is the case, a deceleration unit in the FBS control unit is set into operation, which produces a signal that causes de-activation of the hydraulic pump 10 after a predetermined length of time $\Delta t$ which begins when the threshold value is not reached.

The predetermined length of time ranges between 100 ms and 1000 ms and, preferably, between 400 ms and 600 ms. The value 500 ms for the length of time is especially preferred.

Figure 3:
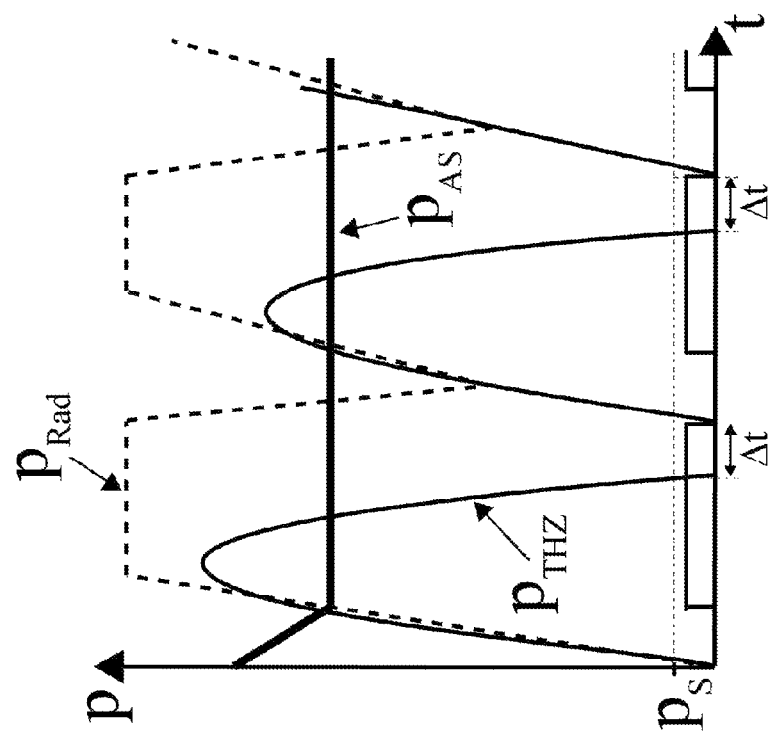
FIG. 3 is a diagram illustrating the time variation of the brake pressure in a wheel brake and the master brake cylinder, the activation threshold of the FBS function, and the activity of the FBS function according to the invention.

The diagram in FIG. 3 illustrates this procedure by means of the time variations of the brake pressure $p_{TMC}$ in the master brake cylinder 3 and the wheel brake pressure $p_{wheel}$ as well as the activation threshold $p_{AT}$. It is also illustrated in which periods of time the FBS function is activated or the hydraulic pump 10 is switched on (FBS active), just as well the threshold value $p_T$ and the length of time $\Delta t$.

As can be seen in FIG. 3, the FBS function is activated when the brake pressure $p_{TMC}$ in the master brake cylinder 3 exceeds the activation threshold $p_{AT}$, as is also provided in the known embodiment of the FBS function.

When the brake pressure $p_{TMC}$ reaches the activation threshold $p_{AT}$ due to discharge of hydraulic fluid out of the master brake cylinder 3, the FBS intervention of the present invention is, however, continued for the length of time $\Delta t$, which is in contrast to the known embodiment of the FBS function.

When the brake pressure $p_{TMC}$ drops, vacuum will develop in the master brake cylinder 3 so that a sealant opens, which exists between the master brake cylinder 3 and the supply tank 4 when the brake is applied. In master brake cylinders 3 having a central valve arranged in the piston that separates the pressure chamber from the supply tank 4, the central valve opens when vacuum prevails in the pressure chamber in relation to the supply tank 4. In master brake cylinders 3 where the pressure chamber is isolated from the supply tank by means of a sleeve, the sleeve will 'tilt over' in the event of vacuum in the pressure chamber.

Consequently, hydraulic fluid flows out of the supply tank 4 into the master brake cylinder 3, which is pumped by means of the hydraulic pump 10 into the wheel brakes 5 in order to maintain the value of the wheel brake pressure $p_{wheel}$. Thus, the hydraulic pup 10 aspirates hydraulic fluid out of the supply tank 4 by way of the master brake cylinder 3.

Only after the expiry of the length of time $\Delta t$ will the hydraulic pump 10 be deactivated and the FBS intervention terminated this way. After disabling of the hydraulic pump 10, hydraulic fluid flows out of the wheel brakes 5 back into the master brake cylinder 3, whereby the brake pressure $p_{TMC}$ in the master brake cylinder 3 increases.

When the brake pressure $p_{TMC}$ exceeds again the activation threshold $p_{AT}$, the FBS function is re-activated and the hydraulic pump 10 is switched on again.

Thus, the invention also includes a clockwise activation of the FBS function during a brake operation. However, the invention is advantageous in that the phases in which the FBS function is activated are extended so that the FBS function is activated for a longer time during the brake operation.

This achieves a higher braking effect for a brake operation in a situation in which the effectiveness of the brake system is reduced. This renders it possible to considerably shorten the stopping distance and enhance the vehicle safety.

LIST OF REFERENCE NUMERALS 1 actuating device
2 brake booster
3 master brake cylinder
4 supply tank
5 wheel brake
6 hydraulic unit
7 separating valve
8 inlet valve
9 motor
10 hydraulic pump
11 change-over valve
12 outlet valve
13 low-pressure accumulator
14 pressure sensor
p pressure
$p_{AT}$ activation threshold of the FBS function
$p_{wheel}$ brake pressure in the wheel brakes
$p_{TMC}$ brake pressure in the master brake cylinder
$p_T$ predetermined threshold value
t time
$\Delta t$ predetermined length of time

The invention claimed is:

1. A method for increasing a braking effect in a motor vehicle having a hydraulic brake system, wherein in case of a reduced effectiveness of the brake system, a brake pressure in at least one wheel brake is increased by switching on an energy supply unit, the method comprising:
checking, when a energy supply unit (9, 10) is enabled, whether a brake pressure ($p_{TMC}$) in a master brake cylinder (3) reaches a predetermined threshold value ($p_T$);
disabling the energy supply unit (9, 10) upon expiry of a predetermined length of time ($\Delta t$), which begins when it is detected that the brake pressure ($p_{TMC}$) has reached the predetermined threshold value ($p_T$) to provide fading brake support; and
detecting a reduced effectiveness of the brake system when the brake pressure ($p_{TMC}$) in the master brake cylinder (3) exceeds an activation threshold ($p_{AT}$), wherein the activation threshold $p_{AT}$ is determined depending on vehicle deceleration.

2. A method according to claim 1, wherein the predetermined length of time ($\Delta t$) ranges between 100 ms and 1000 ms.

3. A method according to claim 1, wherein the predetermined length of time ($\Delta t$) ranges between 400 ms and 600 ms.

4. A method according to claim 1, wherein the energy supply unit (9, 10) is a hydraulic pump (10) driven by a motor (9).

5. A method according to claim 1, wherein the energy supply unit (9, 10) is a component of an electronic stability control system.

6. A device for increasing a braking effect of a hydraulic brake system of a motor vehicle, having a master brake cylinder, in which a brake pressure transmittable to at least one wheel brake can be built up, the device comprising:
a pressure sensor adapted to sense the brake pressure in the master brake cylinder;
a control unit connected to the pressure sensor;
an energy supply unit that is controllable by the control unit and can be enabled when it is detected in the control unit that the brake pressure in the master brake cylinder exceeds an activation threshold value that is calculated depending on the vehicle deceleration, such that the device provides fading brake support;
a deceleration unit, which can be activated by the control unit, with an energy supply unit (9, 10) enabled, when the brake pressure ($p_{TMC}$) reaches a predetermined threshold value ($p_T$), and the deceleration unit is used to produce a signal upon expiry of a predetermined length of time ($\Delta T$) after its activation, which signal causes deactivation of the energy supply unit (9, 10); and
wherein a reduced effectiveness of the brake system is detected when the brake pressure ($p_{TMC}$) in the master brake cylinder (3) exceeds an activation threshold ($p_{AT}$) that is determined depending on vehicle deceleration.

7. A method for increasing a braking effect in a motor vehicle having a hydraulic brake system:
enabling an energy supply unit (9, 10) to increase a brake pressure in at least one wheel brake when a brake pressure ($p_{TMC}$) in a master brake cylinder (3) exceeds an activation threshold value ($p_{AT}$) to provide fading brake support;
checking when a brake pressure in a master brake cylinder reaches a predetermined threshold value ($p_T$); and
disabling the energy supply unit (9, 10) upon expiry of a predetermined length of time ($\Delta t$), which begins when it is detected that the brake pressure ($p_{TMC}$) has reached the predetermined threshold value ($p_T$); and
detecting a reduced effectiveness of the brake system when the brake pressure ($p_{TMC}$) in the master brake cylinder (3) exceeds an activation threshold ($p_{AT}$), wherein the activation threshold $p_{AT}$ is determined depending on vehicle deceleration.

8. The method of claim 7, wherein the predetermined length of time ($\Delta t$) ranges between 100 ms and 1000 ms.

9. The method of claim 7, wherein the predetermined length of time ($\Delta t$) ranges between 400 ms and 600 ms.

10. The method of claim 7, wherein the energy supply unit (9, 10) is a hydraulic pump (10) driven by a motor (9).

11. The method of claim 7, wherein the energy supply unit (9, 10) is a component of an electronic stability control system.

12. The method of claim 7, further comprising during the braking application repeating the steps of enabling the energy supply unit when the activation threshold is exceeded and deactivating the energy supply unit after the predetermined time when the pressure threshold is detected.

13. The method of claim 1, further comprising during the braking application repeating the steps of enabling the energy supply unit when the activation threshold is exceeded and deactivating the energy supply unit after the predetermined time when the pressure threshold is detected.

14. The device of claim 6, wherein the energy supply unit is activated for the predetermined time when the activation threshold is exceeded and deactivated upon expiration of the predetermined time for the duration of the braking application.

* * * * *